United States Patent [19]
Kim

[11] Patent Number: 5,617,094
[45] Date of Patent: Apr. 1, 1997

[54] INVERSE QUANTIZER

[75] Inventor: Si J. Kim, Seoul, Rep. of Korea

[73] Assignee: Goldstar Co., Ltd., Seoul, Rep. of Korea

[21] Appl. No.: 158,998

[22] Filed: Nov. 30, 1993

[30] Foreign Application Priority Data

Nov. 30, 1993 [KR] Rep. of Korea ............... 92-22803

[51] Int. Cl.$^6$ ..................................... H03M 1/00
[52] U.S. Cl. ........................................... 341/200
[58] Field of Search ................. 341/200, 51, 144; 358/135; 375/26

[56] References Cited

U.S. PATENT DOCUMENTS 4,862,173  8/1989  Nishitani .
4,933,763  6/1990  Chantelou .................... 358/136

*Primary Examiner*—Brian K. Young
*Attorney, Agent, or Firm*—Helfgott & Karas,PC.

[57] ABSTRACT

An inverse quantizing device includes memories which are addressed by input quantized coefficients and quantization levels and store resultant data of inverse quantization in groups such as intra DC, intra AC and non-intra. A control section discriminates the group of an input data to be inverse-quantized according to input block-type and block-strobe signals, selects one of the memories according to the discriminated result, and controls the selected memory to output the resultant data of inverse quantization stored therein. According to the device, real time processing of the input data is achieved with its simplified construction.

3 Claims, 3 Drawing Sheets

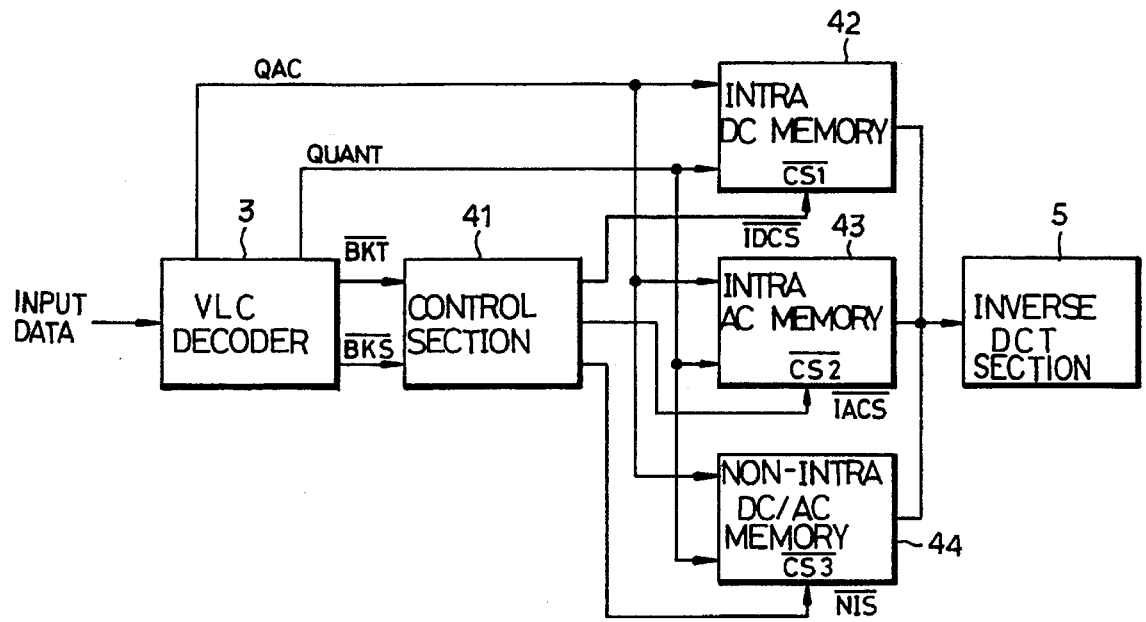
F I G. 2
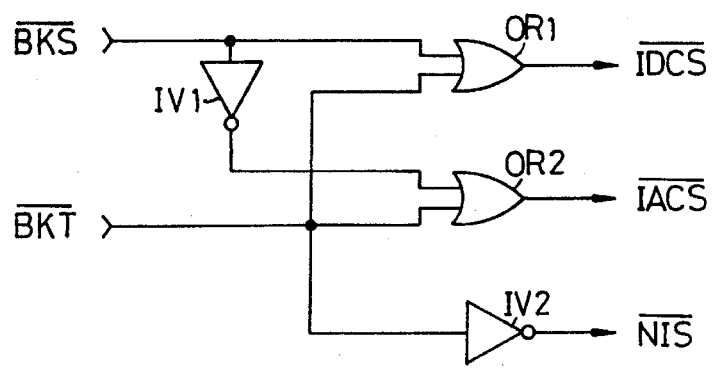
F I G. 3

FIG. 4

| $\overline{BKT}$ | $\overline{BKS}$ | INTRA DC | INTRA AC | NON-INTRA |
|---|---|---|---|---|
| I | X | H | H | L |
| O | O | L | H | H |
| O | I | H | L | H |

( *LOW: ACTIVE )

INVERSE QUANTIZER

BACKGROUND OF THE INVENTION

1. Field of the Invention

The present invention relates to an image data compression/expansion technique, and more particularly to an inverse quantizing device for inverse-quantizing a compressed image data.

2. Description of the Prior Art

International Standards Organization (ISO) has proposed using the MPEG SM3 model as a data compression standard for an image in motion.

In image data compression, transform coefficients obtained by DCT(Discrete Cosine Transform)-transforming the image data is compressed into a predetermined amount of data by a quantizer, the operation of which is related to the following equations:

1) In intra mode:

$$QDC = dc/8$$

$$\tilde{ac}(i,j) = [16 * ac(i,j)] // w(i,j)$$

$$QAC(i,j) = \tilde{ac}(i,j) // g$$

where g is a quantization step size and g=2*QUANT, W(i,j) is a weight matrix, QAC is a quantized coefficient and QUANT is a quantization level.

2) In non-intra mode:

$$\begin{aligned} QAC(i,j) &= ac(i,j)/(2*QUANT), \quad QUANT = odd \\ &= [ac(i,j) + 1]/(2*QUANT), \\ &\quad QUANT = even, ac(i,j) > 0 \\ &= [ac(i,j) - 1]/(2*QUANT), \\ &\quad QUANT = even, ac(i,j) < 0 \end{aligned}$$

In the above equations, the DCT coefficients may be divided into dc coefficients having concentrated energy and ac coefficients having a large value of energy dispersion. Also, the quantizer performs quantization in two modes i.e., an intra mode and a non-intra mode. That is, the interrelationship of an input data is detected and if the detected interrelationship is relatively low, the intra mode is performed in which the dc and ac coefficients are quantized in different manners, while if the detected interrelationship is relatively high, the non-intra mode is performed in which the quantization is performed according to the above equation regardless of the dc or ac coefficients.

Inverse quantization is the inverse process of quantization, by which the dc or ac coefficients are calculated in accordance with the values of the quantized coefficients QAC and the quantization level QUANT.

FIG. 1 shows the construction of a conventional decoder adopting the MPEG SM3 standard as described above. According to the decoder of FIG. 1, data outputted from header detection section 1 for detecting a header signal from an input data is inputted to VLC(Variable Length Code) decoder 3 through buffer 2.

VLC decoder 3 converts the input data into a FLC(Fixed Length Code) and the FLC is then inverse-quantized by inverse quantizer 4. The output of inverse quantizer 4 is inverse-DCT-transformed by inverse DCT section 5 and the output of inverse DCT section 5 is applied to adder 7. At this time, predictor 6 outputs a predicted value in accordance with the outputs of VLC decoder 3 and adder 7, and this predicted value is applied to adder 7 to be added to the output of inverse DCT section 5. Adder 7 outputs a final decoded signal.

The inverse quantizer mentioned as above, however, suffers from disadvantages in that hardware construction thereof is greatly complicated, causing the manufacturing cost to be increased and possibly complicating to a high degree the timing control for real time data processing as well.

SUMMARY OF THE INVENTION

It is an object of the present invention to provide an inverse quantizing device which has a simple structure utilizing memories, and thereby great reductions in manufacturing costs can be achieved.

It is another object of the present invention to provide an inverse quantizing device which enables real time processing of input data and easy control therefor.

In order to achieve the above objects, the inverse quantizing device according to the present invention comprises:

a plurality of memories for receiving input quantized coefficients and quantization levels as their address data and storing resultant data of inverse quantization in groups; and control means for discriminating the group of the input data to be inverse-quantized in accordance with an input block-type and block-strobe signals and providing a selection control signal for selecting one of said plurality of memories which stores the resultant data of the discriminated group;

whereby the resultant data stored at an address of the selected memory which is assigned by the input quantized coefficients and the quantization levels is provided.

BRIEF DESCRIPTION OF THE DRAWINGS

The above objects and other features of the present invention will become more apparent by describing the preferred embodiment thereof with reference to the accompanying drawings, in which:

FIG. 2 is a schematic block diagram of the inverse quantizing device according to the present invention.

FIG. 3 is a circuit diagram of the control section in FIG. 2.

FIG. 4 is a truth table explaining the operation of the control section of FIG. 3.

DETAILED DESCRIPTION OF THE PREFERRED EMBODIMENT

Figure 1:
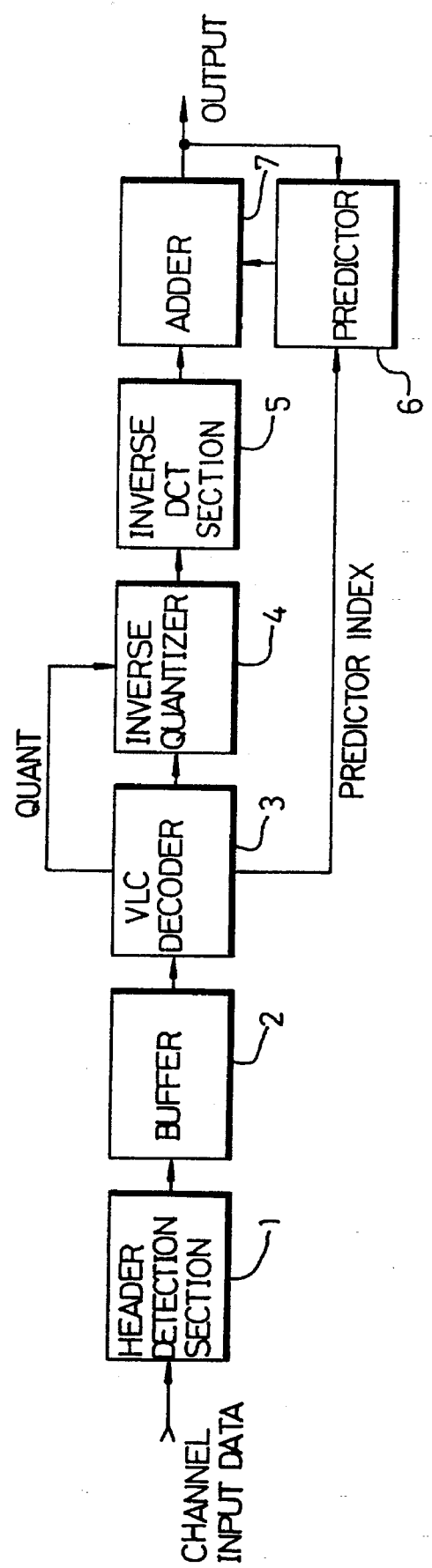
FIG. 1 is a schematic block diagram of a conventional decoder.

FIG. 2 shows the construction of the inverse quantizing device according to the present invention. Referring to FIG. 2, the inverse quantizing device is provided with intra DC memory 42, intra AC memory 43 and non-intra DC/AC memory 44 each of which receives quantized coefficients QAC and quantization level values QUANT outputted from VLC decoder 3 as their address data, stores the resultant data of inverse quantization in groups, and outputs the resultant data to inverse DCT section 5.

The device is also provided with control section 41 which discriminates whether the input data is an intra DC, an intra AC or a non-intra data and selectively outputs first to third chip selection signals $\overline{IDCS}$, $\overline{IACS}$ and $\overline{INS}$ to chip selection terminals $\overline{CS1}$ to $\overline{CS3}$ of the memories 42 to 44 in accordance with the discriminated result.

In the embodiment, each memory 42, 43 or 44 is composed of a PROM(Programmable Road Only Memory).

Meanwhile, control section 41, as shown in FIG. 3, comprises first OR gate OR1 for OR-gating block-type signal $\overline{BKT}$ and block-strobe signal $\overline{BKS}$ to output first chip selection signal $\overline{IDCS}$, second OR gate OR2 for OR-gating block-strobe signal $\overline{BKS}$ inverted by first inverter IV1 and block-type signal $\overline{BKT}$ to output second chip selection signal $\overline{IACS}$, and second inverter IV2 for inverting block-type signal $\overline{BKT}$ and outputting the inverted block-type signal $\overline{BKT}$ as third chip selection signal $\overline{NIS}$.

Now, the operation of the inverse quantizing device according to the present invention constructed as above will be described in detail.

Each R.G.B. signal, which constitutes a television signal, has a gradation degree of a predetermined level, and thus the DCT-transformed data of the gradation level and the quantized data of the DCT-transformed data have predetermined levels, respectively. According to the present invention, all possible quantized level values are stored in the memories 42 to 44 so that one of the quantized level values is selected and outputted therefrom. Thus, real time data processing can be achieved.

Referring again to FIG. 2, DCT coefficient values QAC and quantization level values QUANT provided from VLC decoder 3 are inputted to intra DC memory 42, intra AC memory 43 and non-intra DC/AC memory 44, respectively, as their address data. Such address data may be expressed in terms of 64 samples since inverse quantization should be performed with respect to 64 sample data in order to inverse-quantize an 8×8 IDCT data block.

Also, as described above, the resultant data of vertical inverse quantization are stored at addresses of the memories 42 to 44 in conformity with the group of the resultant data.

Meanwhile, the block-type signal $\overline{BKT}$ identifying whether the input block data to be inverse-quantized is intra or non-intra, and block-strobe signal $\overline{BKS}$ identifying the start of the block data are also provided from VLC decoder 3 to control section 41.

At this time, as shown in the truth table of FIG. 4, if the input block data to be inverse-quantized is intra and the start of the block data is identified, both of block-type signal $\overline{BKT}$ and block-strobe signal $\overline{BKS}$ become LOW("0"), and as shown in FIG. 3, chip selection signal $\overline{IDCS}$ of a LOW level is outputted from OR gate OR1 in control section 41 and then applied to chip selection terminal $\overline{CS1}$ of intra DC memory 42. Accordingly, intra DC memory 42 is selected and the resultant data of inverse quantization stored at its address assigned by the input QAC and QUANT is outputted to inverse DCT section 5.

Also, if the input block data is intra and the middle or the end of the block data is identified, block-type signal $\overline{BKT}$ becomes LOW ("0") and block-strobe signal $\overline{BKS}$ becomes HIGH("1"), and chip selection signal $\overline{IACS}$ of a LOW level is outputted from OR gate OR2 and then applied to chip selection terminal $\overline{CS2}$ of intra AC memory 43. Accordingly, intra AC memory 43 is selected and the resultant data of inverse quantization stored at its address assigned by QAC and QUANT is outputted to inverse DCT section 5.

Meanwhile, if the input block data is non-intra, block-type signal $\overline{BKT}$ becomes HIGH("1") and thus both outputs of OR gates OR1 and OR2 become HIGH regardless of the state of block-strobe signal $\overline{BKS}$. Accordingly, chip selection signal $\overline{NIS}$ of a LOW level is outputted from inverter IV2 and then applied to chip selection terminal $\overline{CS3}$ of non-intra DC/AC memory 44, resulting in that non-intra DC/AC memory 44 is selected and the resultant data of inverse quantization stored at its address assigned by QAC and QUANT is outputted to inverse DCT section 5.

From the foregoing, it will be apparent that the present invention provides a novel inverse quantizer specially designed to store in groups all possible resultant data of inverse quantization in memories which are addressed by the input quantized coefficients and quantization levels and provide the resultant data of inverse quantization stored in one of the memories in accordance with the input block-type and block-strobe signals, thereby enabling real time processing of the input data and easy control of the data processing and achieving great reductions in construction and cost.

While the present invention has been described and illustrated herein with reference to the preferred embodiment thereof, it will be understood by those skilled in the art that various changes in form and details may be made therein without departing from the spirit and scope of the invention.

What is claimed is:

1. An inverse quantizing device comprising:
   a plurality of memories for receiving input quantized coefficients and quantization levels as address data thereof and storing resultant data of inverse quantization in groups; and
   control means for discriminating the group of an input data to be inverse-quantized in accordance with input block-type and block-strobe signals and providing a selection control signal for selecting one of said plurality of memories storing said resultant data of the discriminated group;
   whereby said resultant data stored at the address of the selected one of said plurality of memories assigned by said quantized coefficients and said quantization levels is provided,
   wherein said resultant data of inverse quantization are grouped into block data of intra DC, intra AC and non-intra, respectively, and said plurality of memories are an intra DC memory, an intra AC memory and a non-intra DC/AC memory.

2. An inverse quantizing device comprising:
   a plurality of memories for receiving input quantized coefficients and quantization levels as address data thereof and storing resultant data of inverse quantization in groups; and
   control means for discriminating the group of an input data to be inverse-quantized in accordance with input block-type and block-strobe signals and providing a selection control signal for selecting one of said plurality of memories storing said resultant data of the discriminated group;
   whereby said resultant data stored at the address of the selected one of said plurality of memories assigned by said quantized coefficients and said quantization levels is provided, wherein said plurality of memories are programmable read only memories.

3. An inverse quantizing device comprising:
   a plurality of memories for receiving input quantized coefficients and quantization levels as address data thereof and storing resultant data of inverse quantization in groups; and control means for discriminating the group of an input data to be inverse-quantized in accordance with input block-type and block-strobe signals and providing a selection control signal for selecting one of said plurality of memories storing said resultant data of the discriminated group;

whereby said resultant data stored at the address of the selected one of said plurality of memories assigned by said quantized coefficients and said quantization levels is provided, wherein said control means comprises:

a first OR gate for OR-gating said block-type and block-strobe signals and providing a first chip selection signal;

a first inverter for inverting said block-strobe signal;

a second OR gate for OR-gating the inverted block-strobe signal and said block-type signal and providing a second chip selection signal; and a second inverter for inverting said block-type signal and providing a third chip selection signal.

* * * * *